April 4, 1961 L. H. MORIN 2,977,638
INTEGRAL END STOP FOR SEPARABLE FASTENERS
AND THE METHOD OF PRODUCING THE SAME
Filed Sept. 9, 1955 2 Sheets-Sheet 2
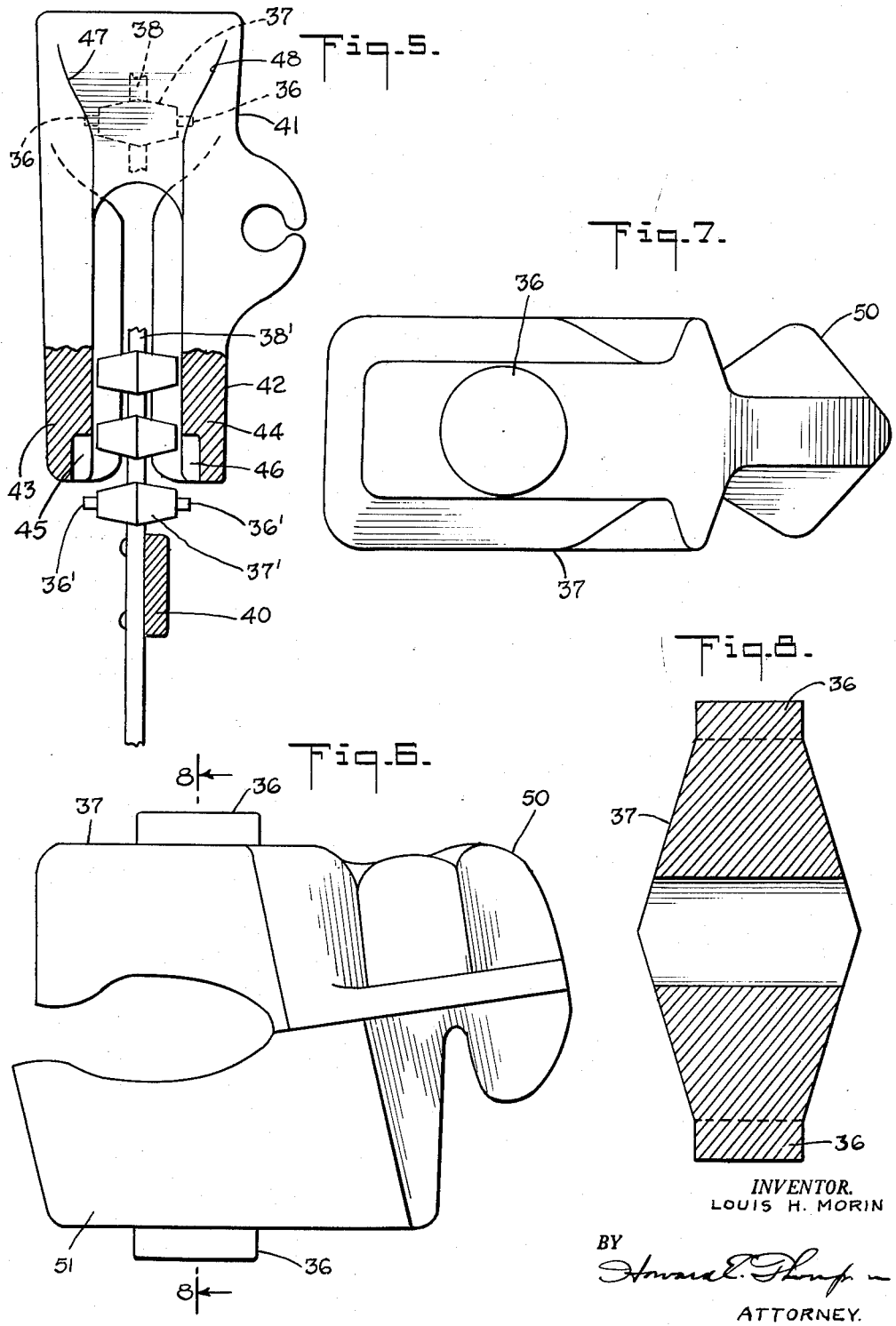
INVENTOR.
LOUIS H. MORIN
BY
ATTORNEY.

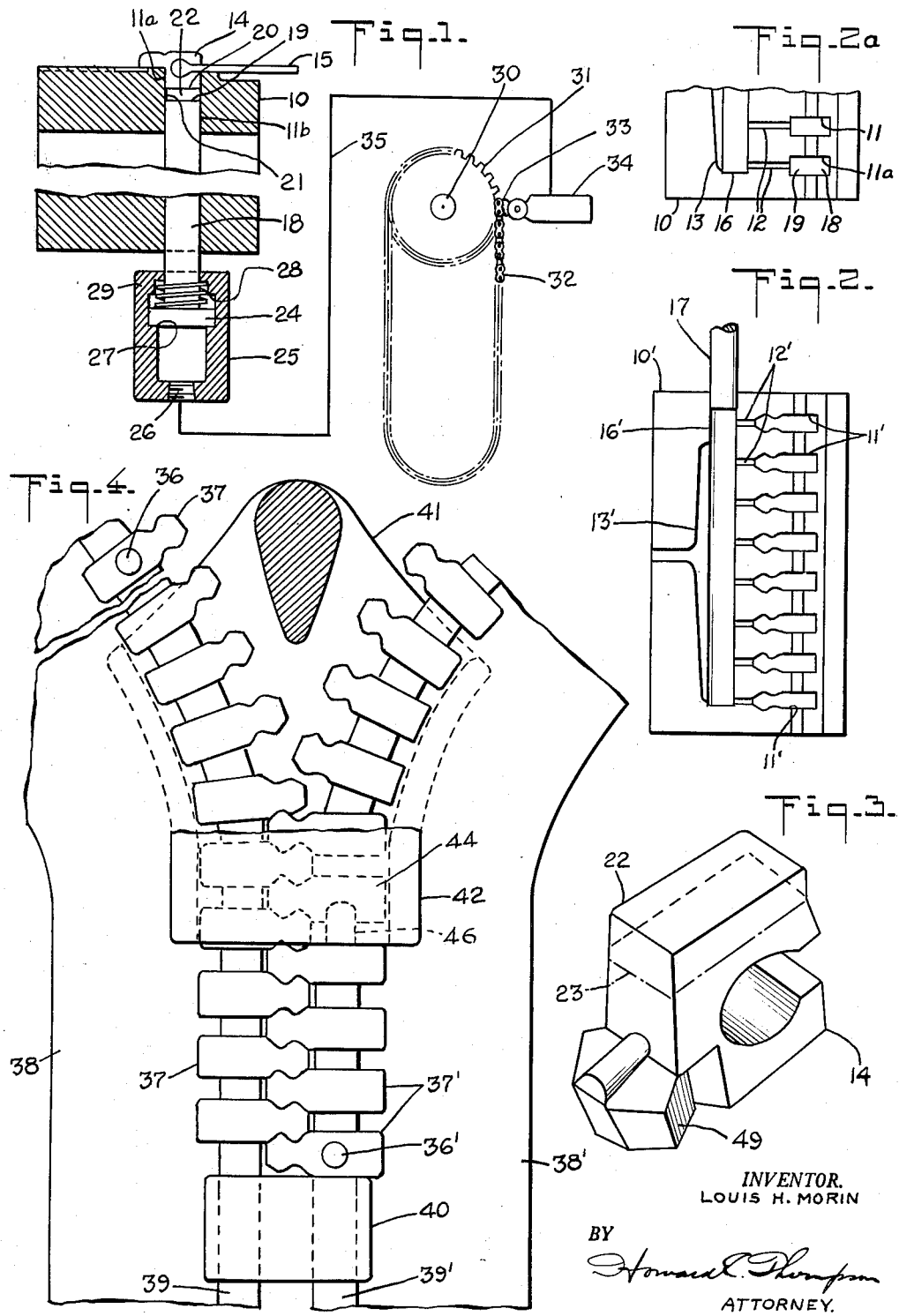

United States Patent Office 2,977,638
Patented Apr. 4, 1961

2,977,638

INTEGRAL END STOP FOR SEPARABLE FASTENERS AND THE METHOD OF PRODUCING THE SAME

Louis H. Morin, Bronx, N.Y.
(125 Beechwood Ave., New Rochelle, N.Y.)

Filed Sept. 9, 1955, Ser. No. 533,325

4 Claims. (Cl. 18—59)

This invention relates to separable fasteners and, particularly, in forming each stringer of the separable fastener with an end scoop, including an integral stop which, in one instance, constitutes what is generally referred to as a top stop and, in other instances, also forms a supplemental bottom stop and strain resisting member.

Still more particularly, the invention deals with a simple method of forming the integral stop on an end scoop of a stringer in the method of forming a continuous stringer chain of varying length.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic view, illustrating the method of forming an integral stop on an end scoop of a stringer chain, part of the structure being shown in section and parts broken away.

Fig. 2 is a diagrammatic plan or face view of one part of a die, or mould, omitting the castings, the die or mould forming one increment of scoops in production of a resulting stringer length.

Fig. 2a is a diagrammatic plan or face view of the lower end portion of the companion die of that seen in Fig. 2, and it corresponds to the die shown in Fig. 1.

Fig. 3 is a perspective detailed view of an end scoop of a stringer, including the integral stop element made in accordance with the teachings of Figs. 1, 2 and 2a of the drawing.

Fig. 4 is an enlarged diagrammatic detailed view of a pair of stringers adjacent one coupled end thereof, showing a modified form of end stop and indicating, in plan and in section, a slider arranged on said stringers.

Fig. 5 is a side and sectional view of the slider, as shown in Fig. 4 of the drawing, diagrammatically illustrating the relationship of end stops with respect to the slider structure.

Fig. 6 is a detailed side view of a scoop, such as diagrammatically shown in Figs. 4 and 5 of the drawing, detached and illustrating the modified form of integral stop element thereon.

Fig. 7 is a plan view of the structure shown in Fig. 6; and

Fig. 8 is a section on the line 8—8 of Fig. 6.

To illustrate one adaptation of my improved method of forming integral stops on end scoops of separable fastener stringers, I have diagrammatically shown, in Figs. 1, 2, and 2a, a pair of mating dies 10 and 10' having a plurality of alined cavities 11 and 11', to which extend small gate passages 12 and 12' from a master gate 13, 13'. The dies are adapted to form an increment of eight scoops, corresponding in number to the number of cavities shown in Fig. 2, on a stringer tape 15, as with other devices of this type and kind. Movable in the master gate passage 13, 13', as well as in a bore 16, 16' leading to said passage is a control pin or rod 17, which is adapted to block off any predetermined number of the small gate passages 12, 12' in controlling the formation of a given stringer length, which would comprise a predetermined number of the increments of eight scoops, as noted in the present illustration, plus any additional number of these eight scoops that may be required in forming the definite stringer length. For example, a stringer may comprise six of the eight-scoop increments, plus three of the scoops of the increment, in which latter instance, the rod 17 would block off all but three of the scoop cavities 11, 11', namely the lower three, as shown in Fig. 2 of the drawing.

In carrying out my present invention, I modify the die structure to the extent of extending a bore or passage 11b (Fig. 1) to the end scoop cavity 11a which forms the first scoop 14 in a stringer length, and disposing in said bore 11b a movable die or mould part or rod 18. Normally, the rod 18 is supported with the end surface 19 in alinement with the side edge 20 of scoop 14. In other words, the line 20 represents a normal boundary surface of scoop cavity 11a but as shown in Fig. 1 the end surface 19 of rod 18 is somewhat spaced from such boundary surface. At the beginning of the production of one stringer length, the rod 18 assumes the position shown in Fig. 1, with the surface 19 spaced with respect to the surface 20 to form a secondary mould chamber, or cavity, 21, which serves to form an integral stop element 22 on the end or first scoop 14, which stop element 22 is clearly shown in detail in Fig. 3 of the drawing, and represents that part of the complete scoop structure which extends beyond the dot and dash line 23 of said figure. It will be apparent that this stop element will normally block the scoop from passage into a slider by virtue of the added thickness in the wall structure of the scoop.

To control, in an automatic manner, the formation of the stop element 22 on the end scoops, as described, the rod 18 extends below the lower or opposite surface of the die or mould and includes, at its lower end, a piston 24 which operates in an air cylinder 25, the showing of which is purely diagrammatic, except from the standpoint of illustrating an air intake and exhaust passage 26 and two stop shoulders 27 and 28, upon which the piston 24 is supported, either by the air or by a spring 29 arranged in the cylinder.

At 30 is shown a shaft of a casting machine which is operated in controlled relationship to the operation of casting the successive increments of scoops and on the shaft 30 is a sprocket 31, upon which rides a control chain 32, having one or more trip links 33 for actuating an air control valve 34, which is in communication with the cylinder 25, as diagrammatically noted by the line 35. Normally, the air, under pressure, supports the piston 24 against the shoulder 28, in other words, with the surface 19 of the rod 18 in alinement with the surface 20, the spring 29 being compressed in this operation. As and when the trip 33 actuates the valve 34, the air will be released from the cylinder, allowing the spring 29 to move the piston 24 into engagement with the shoulder 27, thus providing the additional cavity 21 for casting the integral stop element 22 on the end scoop.

The above method of forming the stop element 22 is applicable to the formation of stop elements 36 Figs. 4–8) on end scoops 37 of a stringer simply by modifying the structure of both dies and in employing dual die or mould parts, similar to the rod 18, which would be operating in each of the die halves, as will be apparent.

The elements 36, as applied to the scoops of stringers, are illustrated in Figs. 4 to 8, inclusive, and, considering Fig. 4, 38, 38' can be considered as two stringer lengths, to the beaded edges 39, 39' of which are attached the scoops 37, 37', the scoops in Fig. 4 of the drawing, as well as in Fig. 5, being diagrammatically shown. In producing a complete fastener, a single stringer, such, for example, as the stringer 38, is simply reversed, that is, folded or looped centrally thereof to form two stringer sides adapted to be coupled together, the scoops of one side engaging those of the other side. A fastener formed of a single stringer in this way is illustrated in Patent No. 2,784,473. As a result of so folding the stringer 38, the top stop 36 thereon will become a supplemental bottom stop element 36' on the stringer 38', which in conjunction with a normal bottom stop 40, coupling the stringers 38, 38', will serve to help absorb the impact of the slider when drawn to the bottom of the fastener, thus reinforcing the bottom stop.

In Figs. 4 and 5 of the drawing, I have indicated at 41 a slightly modified form of slider, in which inner surfaces of the narrow end portion 42 of the slider, or the opposed walls 43 and 44 thereof, will have grooves 45 and 46, respectively, for reception of the bottom stop elements 36', which are on opposed surfaces of the lowermost scoop 37' of the stringer, in other words, the scoop which is arranged adjacent the bottom stop plate or member 40.

In Fig. 5, I have also indicated, in dotted lines the position assumed by the top scoop 37 of the stringer 38, including the top stop elements 36 to indicate that, as the slider 41 is moved into closed position, the elements 36 will strike the beveled or contracting surfaces 47, 48 of the walls 43, 44, thus checking further movement of the slider on the stringers. It is here to be noted that this top stop structure is substantially concealed within the walls of the slider, which enables the top ends of the stringers to be brought into closer proximity to each other.

My improved integral end stop structure can be applied to scoops of various types and kinds. For example, in Fig. 3 of the drawing, the stop element 22 is applied to a scoop 14, wherein the coupling portion 49 of the scoop is disposed entirely upon one side of the scoop structure in accordance with the teachings in my prior application, Serial Number 520,780, filed July 8, 1955, now U.S. Patent No. 2,862,272; whereas, the scoop 37, shown in detail in Figs. 6, 7 and 8, is of the same general structure, with the exception that both side portions of the coupling end 50 of the scoop include coupling portions, both scoops being of what I term the center-ledge type. It will be noted that, in Figs. 6, 7 and 8, the elements 36 are in the form of round dis-type lugs which are substantially upon the mounting end portion 51 of the scoop; whereas, in Fig. 3, the element 22 extends beyond the mounting end portion this latter being done simply to maintain the continuity of the scoop and in simplifying the structure of the rod 18.

With the fastener structure, as shown in Fig. 4 of the drawing, in assembling the stringers, the slider 41 will be of a compression-type, as illustrated, for example, in my prior application Serial Number 295,244, filed June 24, 1952, now Patent No. 2,775,027, issued December 25, 1956. Moreover, the fastener, as illustrated in Fig. 4, is applicable to the method of assembly of separable fastener stringers as generally taught in said prior application.

Having fully described my invention, what I claim as new and desire to secure by Letters Patent is:

1. In a continuous method of forming separable fastener stringer lengths by machine by die casting successive groups of scoops on an intermittently movable stringer tape disposed between a pair of relatively movable dies having a group of mating scoop cavities, each stringer length having an end stop at one end thereof, the improvement comprising moving a die part relative to the other dies to a first position and thereby enlarging, beyond the normal size thereof, the first scoop cavity in said dies before casting the scoops of a stringer length, injecting casting material to said dies to form a group of scoops on said tape and coincidently therewith forming in said first scoop cavity a scoop having an integral enlargement thereon moving the die part to a second position relative to the other dies and thereby, decreasing said first scoop cavity to the normal size thereof, and then successively injecting casting material to said dies to cast successive groups of scoops on said tape, thereby to form a stringer length, said enlargement on said scoop serving as a protruding end stop.

2. In a method of forming separable fastener stringers having stops for checking movement of a slider, wherein groups of scoops are successively cast on a stringer tape supported between a pair of relatively movable dies having a group of mating scoop cavities, which comprises connecting a scoop cavity of one die with a bore cavity in said die having a movable plunger therein, moving the plunger to enlarge said scoop cavity by adding thereto a portion of said bore cavity, casting a group of scoops on the tape and coincidently therewith forming in said enlarged scoop cavity a scoop having an integral enlargement thereon, moving the plunger to decrease said enlarged scoop cavity by blocking off all of said bore cavity preparatory to casting additional scoops, said enlargement on said scoop serving as a protruding stop.

3. In a process for producing separable fastener stringers in which successive increments of scoops are cast on a single tape in a set of mating dies during successive casting cycles, a method of producing a modified scoop varying in shape from the shape of a normal scoop during one cycle comprising the steps of closing a set of mating dies about the tape, positioning the end surface of a movable die part in a first position, the mating dies and the end surface defining a modified die cavity having the shape of a modified scoop, casting a modified scoop on the tape in the modified die cavity, opening the mating dies, moving the mating dies to a new position on the same tape, closing the mating dies on the tape in the new position, positioning the end surface of the movable die part in a second position, the mating dies and the end surface defining a normal die cavity having the shape of a normal scoop, and casting a normal scoop on the tape in the normal die cavity.

4. In a process for producing separable fastener stringers in which successive increments of scoops are cast on a single tape in a set of dies during successive cycles, the improvement for producing a scoop varying in shape from the shape of a normal scoop during one cycle comprising the steps of enlarging a variable die cavity to an enlarged condition by locating the dies in a first position, casting an increment of scoops on the tape, the enlarged variable die cavity producing an enlarged scoop, reducing the variable die cavity to a reduced position by locating the dies in a second position, and casting a second scoop increment on the same tape, the variable die cavity in its reduced position producing a normal scoop.

References Cited in the file of this patent

UNITED STATES PATENTS

| | | |
|---|---|---|
| 2,026,904 | Morin | Jan. 7, 1936 |
| 2,078,016 | Poux | Apr. 20, 1937 |
| 2,134,829 | McWane | Nov. 1, 1938 |
| 2,398,592 | Morin | Apr. 16, 1946 |
| 2,487,359 | Natzler | Nov. 8, 1949 |
| 2,578,442 | Morin | Dec. 11, 1951 |
| 2,660,773 | Dorman | Dec. 1, 1953 |
| 2,683,899 | Richenbach | July 20, 1954 |
| 2,735,139 | Morin | Feb. 21, 1956 |
| 2,742,670 | Morin | Apr. 24, 1956 |